(12) United States Patent
Yazdan Panah et al.

(10) Patent No.: US 8,953,482 B2
(45) Date of Patent: Feb. 10, 2015

(54) METHODS AND APPARATUSES TO IMPROVE ON-TIME THROUGHPUT FOR INTEGRATED MULTI-RAT HETEROGENEOUS NETWORKS

(71) Applicant: Intel Corporation, Santa Clara, CA (US)

(72) Inventors: Ali Yazdan Panah, Alviso, CA (US); Shu-Ping Yeh, Mountain View, CA (US); Nageen Himayat, Fremont, CA (US); Shilpa Talwar, Los Altos, CA (US)

(73) Assignee: Intel Corporation, Santa Clara, CA (US)

( * ) Notice: Subject to any disclaimer, the term of this patent is extended or adjusted under 35 U.S.C. 154(b) by 119 days.

(21) Appl. No.: 13/631,137

(22) Filed: Sep. 28, 2012

(65) Prior Publication Data
US 2013/0301435 A1  Nov. 14, 2013

Related U.S. Application Data

(60) Provisional application No. 61/646,223, filed on May 11, 2012.

(51) Int. Cl.
*H04W 24/10* (2009.01)
*H04J 3/16* (2006.01)
(Continued)

(52) U.S. Cl.
CPC .............. *H04J 3/1694* (2013.01); *H04B 7/26* (2013.01); *H04W 24/10* (2013.01); *H04W 72/0413* (2013.01); *H04W 72/085* (2013.01);
(Continued)

(58) Field of Classification Search
CPC .................................................. H04W 84/105
See application file for complete search history.

(56) References Cited

U.S. PATENT DOCUMENTS 5,412,375 A * 5/1995 Wood ............................ 455/451
5,734,645 A * 3/1998 Raith et al. .................... 370/329
(Continued)

FOREIGN PATENT DOCUMENTS

EP          1503606 A1    2/2005
WO    WO-2008157576 A1   12/2008
(Continued)

OTHER PUBLICATIONS

"International Application Serial No. PCT/US2013/040289, International Search Report mailed Sep. 27, 2013", 3 pgs.
(Continued)

*Primary Examiner* — Bunjob Jaroenchonwanit
(74) *Attorney, Agent, or Firm* — Schwegman Lundberg & Woessner, P.A.

(57) ABSTRACT

Methods and devices for optimizing on-time throughput in a wireless network. An enhanced node B (eNodeB) integrating two or more air interfaces schedules transmissions, for a measurement period, over at least one of the two or more air interfaces. The eNodeB estimates, based on the transmissions, a metric of on-time throughput for the user equipment (UE) within the cell, where on-time throughput is a measure of an amount of data that arrives at a destination before a delay threshold has been reached and at a bit-rate greater than or equal to a target bit-rate. The eNodeB then assigns UEs within the cell to an air interface of the two or more air interface to maximize the metric of on-time throughput for the UEs within the cell.

25 Claims, 6 Drawing Sheets

(51) Int. Cl.
H04B 7/26 (2006.01)
H04W 72/04 (2009.01)
H04W 72/08 (2009.01)
H04W 36/00 (2009.01)
H04J 3/00 (2006.01)
H04B 1/56 (2006.01)
H04W 56/00 (2009.01)
H04W 52/02 (2009.01)
H04W 76/02 (2009.01)
H04W 4/22 (2009.01)
H04W 36/22 (2009.01)
H04B 15/00 (2006.01)
H04B 7/02 (2006.01)
H04B 7/04 (2006.01)
H04B 7/06 (2006.01)
H04W 24/02 (2009.01)
H04W 72/12 (2009.01)
H04L 29/02 (2006.01)
H04W 4/06 (2009.01)
H04W 48/20 (2009.01)
H04W 88/06 (2009.01)
H04W 76/04 (2009.01)
H04W 72/02 (2009.01)
H04W 4/00 (2009.01)
H04W 16/14 (2009.01)

(52) U.S. Cl.
CPC ............... *H04W36/00* (2013.01); *H04J 3/00* (2013.01); *H04B 1/56* (2013.01); *H04W 56/00* (2013.01); *H04W 52/0235* (2013.01); *H04W 52/0212* (2013.01); *H04W 76/027* (2013.01); *H04W 72/042* (2013.01); *H04W 4/22* (2013.01); *H04W 36/22* (2013.01); *H04B 15/00* (2013.01); *H04W 72/082* (2013.01); *H04B 7/024* (2013.01); *H04B 7/0456* (2013.01); *H04B 7/063* (2013.01); *H04B 7/0632* (2013.01); *H04B 7/0639* (2013.01); *H04B 7/0647* (2013.01); *H04W 24/02* (2013.01); *H04W 72/1215* (2013.01); *H04L 29/02* (2013.01); *H04W 4/06* (2013.01); *H04W 48/20* (2013.01); *H04B 7/0473* (2013.01); *H04B 7/0486* (2013.01); *H04B 7/065* (2013.01); *H04W 88/06* (2013.01); *H04W 76/048* (2013.01); *H04W 72/02* (2013.01); *Y02B 60/50* (2013.01); *H04W 4/005* (2013.01); *H04W 16/14* (2013.01)
USPC .......................................... 370/252; 370/338

(56) References Cited

U.S. PATENT DOCUMENTS

| 5,758,295 | A | * | 5/1998 | Ahlberg et al. | 455/566 |
| 5,983,185 | A | * | 11/1999 | Cuffaro et al. | 704/270 |
| 6,400,954 | B1 | * | 6/2002 | Khan et al. | 455/450 |
| 6,999,432 | B2 | * | 2/2006 | Zhang et al. | 370/328 |
| 7,069,008 | B1 | * | 6/2006 | Hill et al. | 455/434 |
| 7,480,486 | B1 | * | 1/2009 | Oh et al. | 455/7 |
| 7,492,737 | B1 | * | 2/2009 | Fong et al. | 370/331 |
| 7,630,733 | B2 | * | 12/2009 | Usuda et al. | 455/522 |
| 8,675,513 | B1 | * | 3/2014 | Vargantwar et al. | 370/252 |
| 2003/0021333 | A1 | * | 1/2003 | Blessent | 375/147 |
| 2003/0031150 | A1 | * | 2/2003 | Yukie | 370/338 |
| 2003/0078050 | A1 | * | 4/2003 | Carlborg et al. | 455/452 |
| 2003/0186695 | A1 | * | 10/2003 | Bridges et al. | 455/432 |
| 2003/0198312 | A1 | * | 10/2003 | Budka et al. | 375/377 |
| 2004/0208183 | A1 | * | 10/2004 | Balachandran et al. | 370/395.21 |
| 2005/0255830 | A1 | * | 11/2005 | Thorson et al. | 455/411 |
| 2006/0025079 | A1 | * | 2/2006 | Sutskover et al. | 455/67.11 |
| 2006/0046662 | A1 | * | 3/2006 | Moulsley et al. | 455/69 |
| 2006/0068777 | A1 | * | 3/2006 | Sadowsky et al. | 455/427 |
| 2007/0091836 | A1 | * | 4/2007 | Oprescu-Surcobe et al. | 370/318 |
| 2007/0177501 | A1 | * | 8/2007 | Papasakellariou | 370/229 |
| 2007/0286124 | A1 | * | 12/2007 | Grant et al. | 370/331 |
| 2008/0002631 | A1 | * | 1/2008 | Ramachandran | 370/338 |
| 2008/0039038 | A1 | * | 2/2008 | Hoekstra et al. | 455/187.1 |
| 2008/0293424 | A1 | * | 11/2008 | Cho et al. | 455/450 |
| 2010/0015986 | A1 | * | 1/2010 | Kono | 455/450 |
| 2010/0029286 | A1 | * | 2/2010 | Pfeiffer | 455/446 |
| 2010/0075678 | A1 | * | 3/2010 | Akman et al. | 455/436 |
| 2010/0080176 | A1 | * | 4/2010 | Maas et al. | 370/329 |
| 2010/0081449 | A1 | * | 4/2010 | Chaudhri et al. | 455/452.2 |
| 2010/0111009 | A1 | * | 5/2010 | Pajukoski et al. | 370/329 |
| 2010/0284346 | A1 | * | 11/2010 | Rudrapatna et al. | 370/329 |
| 2011/0034193 | A1 | * | 2/2011 | Park et al. | 455/509 |
| 2011/0189997 | A1 | * | 8/2011 | Tiwari et al. | 455/443 |
| 2012/0026913 | A1 | * | 2/2012 | Reznik et al. | 370/252 |
| 2012/0142293 | A1 | * | 6/2012 | Mueck et al. | 455/130 |
| 2012/0230198 | A1 | * | 9/2012 | Ait-Ameur et al. | 370/236 |
| 2012/0252442 | A1 | * | 10/2012 | Fu et al. | 455/426.1 |
| 2012/0329515 | A1 | * | 12/2012 | Husted et al. | 455/552.1 |
| 2013/0094613 | A1 | * | 4/2013 | Khan | 375/316 |
| 2013/0222515 | A1 | * | 8/2013 | Abuan et al. | 348/14.01 |
| 2013/0242966 | A1 | * | 9/2013 | Zhou et al. | 370/338 |
| 2013/0303215 | A1 | * | 11/2013 | Piipponen et al. | 455/501 |
| 2014/0066083 | A1 | * | 3/2014 | Hui et al. | 455/452.1 |

FOREIGN PATENT DOCUMENTS

WO WO-2011002690 A1 1/2011
WO WO-2012046925 A1 4/2012

OTHER PUBLICATIONS

"International Application Serial No. PCT/US2013/040289, Written Opinion mailed Sep. 27, 2013", 6 pgs.

* cited by examiner

METHODS AND APPARATUSES TO IMPROVE ON-TIME THROUGHPUT FOR INTEGRATED MULTI-RAT HETEROGENEOUS NETWORKS

CROSS-REFERENCE TO RELATED APPLICATIONS

This application claims priority to U.S. Provisional Patent Application No. 61/646,223 entitled "Advanced Wireless Communication Systems and Techniques" filed on May 11, 2012, the content of which is incorporated herein by reference in its entirety.

TECHNICAL FIELD

Embodiments pertain to wireless communications. Some embodiments relate to heterogeneous networks that integrate multiple radio access technologies (RATs).

BACKGROUND

Multi-tier, multi-RAT (Radio Access Technology) heterogeneous networks (Het-Nets) are a new direction in network architectures for cost-effectively adding cellular capacity and coverage. This architecture comprises a tier of small cells (e.g., pico cells, femto cells, or relay stations) overlaid on the macro cellular network to augment network capacity. Recent Het-Net architectures also support Wi-Fi-based small cells, exploiting an unlicensed spectrum to augment cellular capacity. Multi-RAT cells integrating both Wi-Fi and cellular air interfaces in a single infrastructure device are also an emerging trend. When used with multi-RAT client devices or user equipment (UEs), the integrated multi-RAT infrastructure provides an additional "virtual Wi-Fi" carrier that can be exploited to improve capacity and quality of service (QoS) performance of multi-tier Het-Net deployments.

In multi-tier multi-RAT systems, UEs may be assigned to transmit and receive using one or the other of the RATs supported by the integrated system. Algorithms may be used to perform this assigning based on, for example, throughput on links using the different RATs. However, algorithms used for this assigning do not account for whether user traffic or applications are time-sensitive. Accordingly, even when the throughput itself is at an acceptable level, data packets arriving after the delay limit for time-sensitive applications may be discarded, resulting in a degradation of the user experience.

Thus, there is a general need for methods and systems to assign UEs to one RAT of multiple RATs supported by an integrated base station taking into account metrics related to "on-time" throughput. Time-sensitive user applications may then obtain data packets in a timely fashion with no reduction in quality of service (QoS) for delay-sensitive traffic. Further, while on-time throughput metrics may be accurately determined for some RATs by examining, for example, quality feedback indicators and UE load, on-time throughput metrics may be more difficult to obtain for other RATs. Therefore, there is a further general need for a measurement-based approach to determining on-time throughput on links using those RATs wherein on-time throughput can be estimated based on measurements derived from actual transmissions, the transmissions being scheduled according to various criteria by the integrated base station.

DETAILED DESCRIPTION

The following description is presented to enable any person skilled in the art to create and use enhanced Node Bs (eNodeBs), user equipment (UEs), and related methods for partitioning UEs between multiple radio access technologies (RATs) integrated within an eNodeB. The methods and systems described herein incorporate UE-based and eNodeB-assisted techniques for selecting RATs such that on-time throughput is maximized. On-time throughput, in the context of example embodiments hereinafter described, is a measure of an amount of data that arrives at a destination before a delay threshold has been reached and at a bit-rate greater than or equal to a target bit-rate. The described systems and methods may estimate on-time throughput across RATs supported within the cell served by the eNodeB. The eNodeB may schedule measurement periods, and UEs or the eNodeB may generate estimates of on-time throughput based on transmissions occurring during those measurement periods.

The specific case of integrated Wi-Fi-LTE (Long Term Evolution) small cells is considered, but the disclosed techniques are applicable to other RATs as well. As a non-limiting example, the disclosed techniques may be applicable to Bluetooth, mm-wave, or 60 GHz RATs. Further, the disclosed techniques may be implemented on other architectures such as macro base stations and Wi-Fi access points.

Various modifications to the embodiments will be readily apparent to those skilled in the art, and the generic principles defined herein may be applied to other embodiments and applications without departing from the scope of the invention. Moreover, in the following description, numerous details are set forth for the purpose of explanation. However, one of ordinary skill in the art will realize that embodiments of the invention may be practiced without the use of these specific details. In other instances, well-known structures and processes are not shown in block diagram form in order not to obscure the description of the embodiments of the invention with unnecessary detail. Thus, the present disclosure is not intended to be limited to the embodiments shown, but is to be accorded the widest scope consistent with the principles and features disclosed herein.

Figure 1:
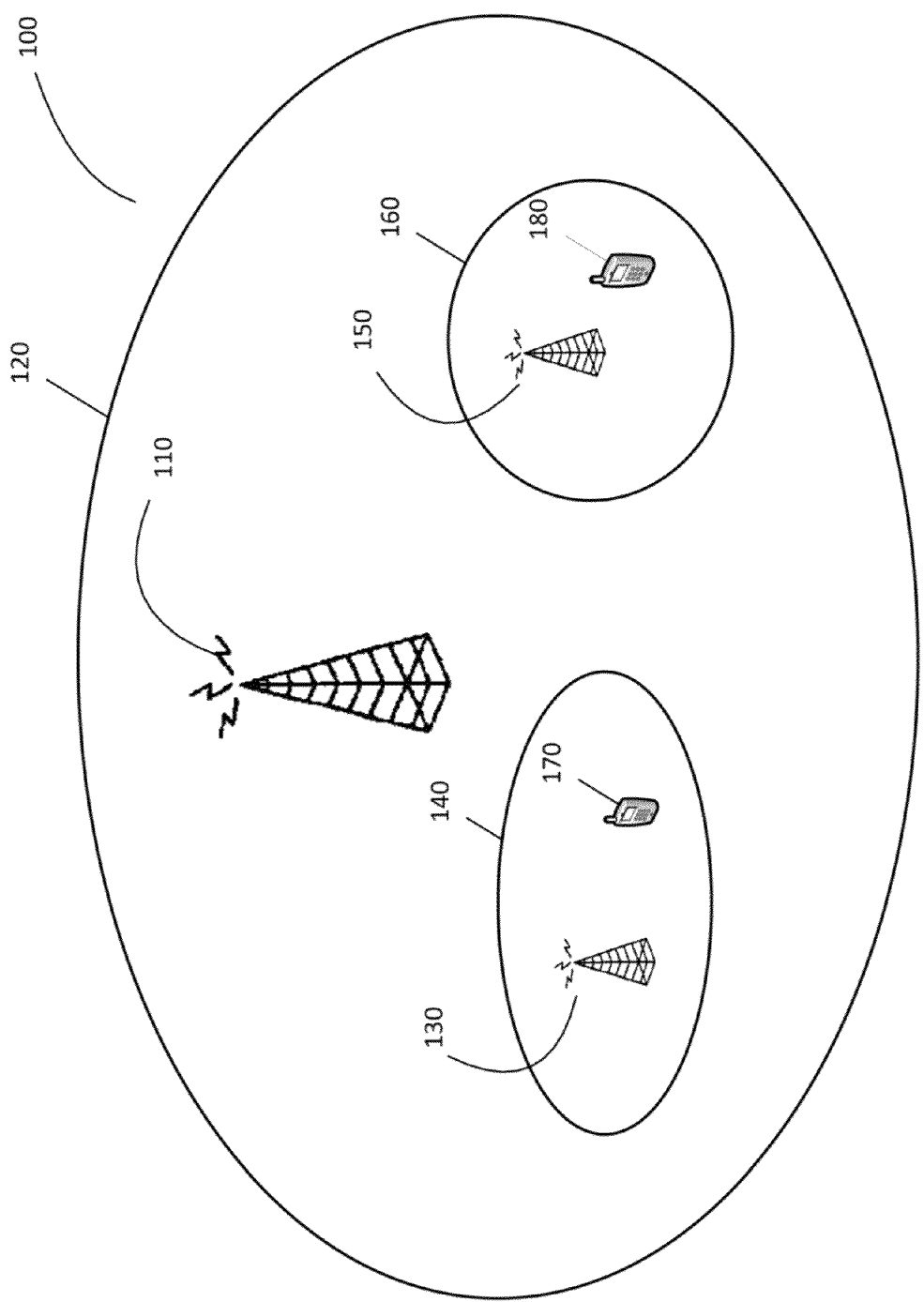
FIG. 1 illustrates an example portion of a network according to some embodiments.

FIG. 1 shows an example of a Het-Net that includes a macro base station 110 with a coverage zone 120, a pico base station (PBS) 130 with a coverage zone 140, a PBS 150 with a coverage zone 160, and user equipment (UEs) 170 and 180 that may associate with either the macro base station 110 or PBSs 130 and 150 when they are in the appropriate coverage zones.

Wi-Fi spectrum may also be exploited within integrated multi-RAT small cells. Example embodiments implement UE partitioning techniques to optimally partition UEs between the Wi-Fi and LTE interfaces on the integrated small cell. Example embodiments may partition UEs between Wi- Fi and LTE interfaces such that on-time throughput, or "goodput," is optimized within the geographical area, or cell, served by a PBS 130, 150. However, example embodiments are not limited to pico cell-level maximization of on-time throughput. Rather, the methods described with respect to example embodiments may be extended for cases in which RATs are distributed, for example, when RATs are connected via fiber or other means. Methods described herein, therefore, can be implemented by a central agent operating over a larger geographical area. For example, the methods may be implemented in a macro base station 110.

The methods for partitioning UEs between Wi-Fi and LTE interfaces may be implemented by appropriate programming and/or hardware configuration of the PBSs and UEs. Unless indicated to the contrary by context, the terms "picocell" and "pico base station" as used herein should be taken to refer to a conventional picocell, a femtocell, microcell or any other type of small cell. The mobile devices referred to herein as UEs should be understood to refer to any type of mobile device or station that can become associated with the base station of a cell. For example, the PBSs may be eNodeBs in accordance with the LTE specification and provide an LTE air interface for associated users designated as UEs. The PBSs may additionally provide a Wi-Fi interface or other type of air interface for associated users in addition to the air interface used to communicate with the macro base station.

Figure 2:
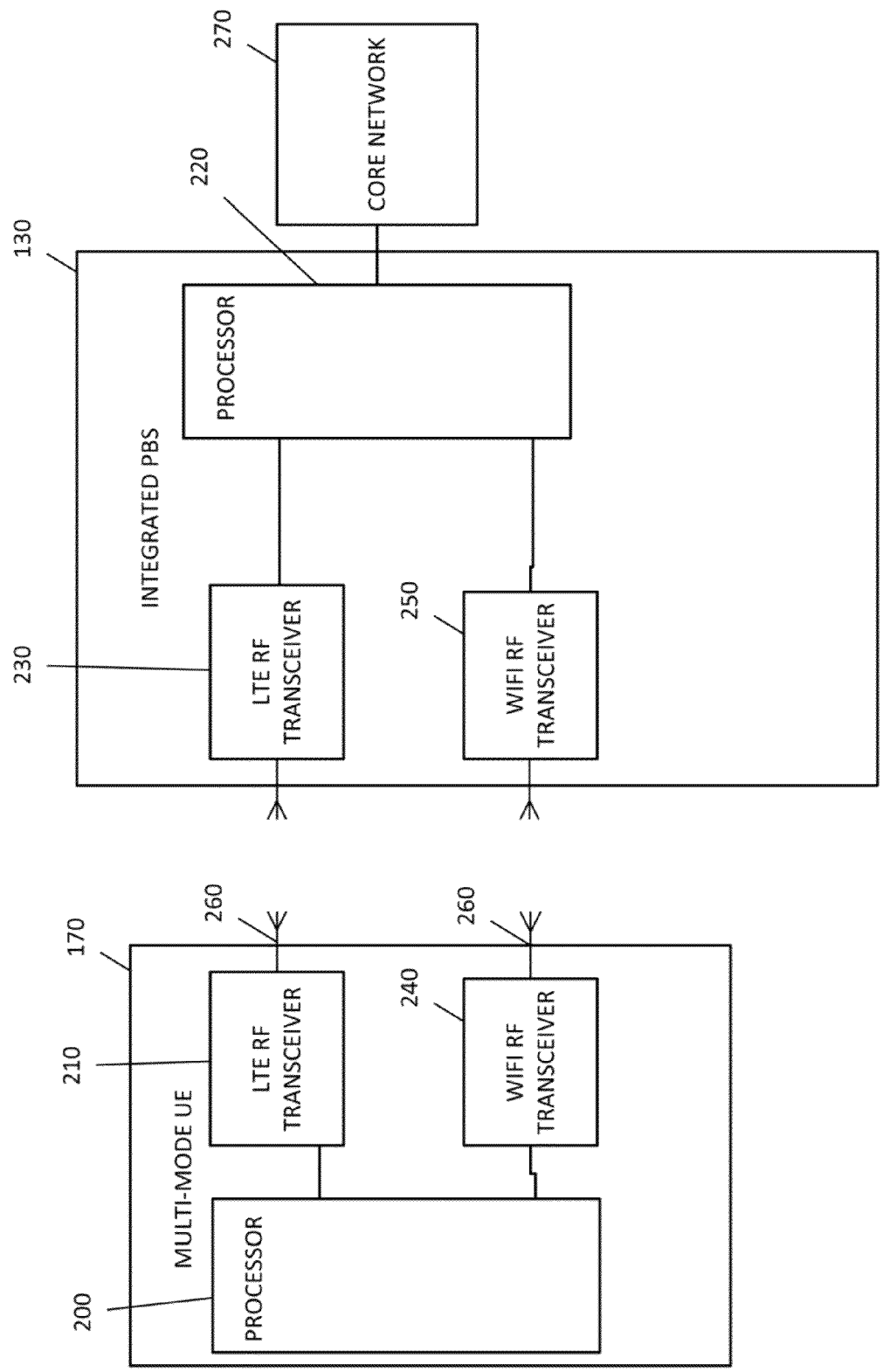
FIG. 2 illustrates the hardware components of a user equipment (UE) and base station according to some embodiments.

FIG. 2 shows the basic components of a UE 170 capable of operating in multiple modes, for example over a cellular interface and a Wi-Fi interface, and an integrated PBS 130 providing both cellular and Wi-Fi interfaces. The UE 170 has a processor 200 and LTE RF Transceiver 210, and one or more antennas 260. The PBS 130 also has a processor 220 and LTE RF Transceiver 230. The PBS 130 and UE 170 are additionally equipped with a Wi-Fi RF transceiver 240 and 250, respectively. The PBS 130 also has a communications link to a core network 300 by which associated UEs are connected to the core network.

Figure 3:
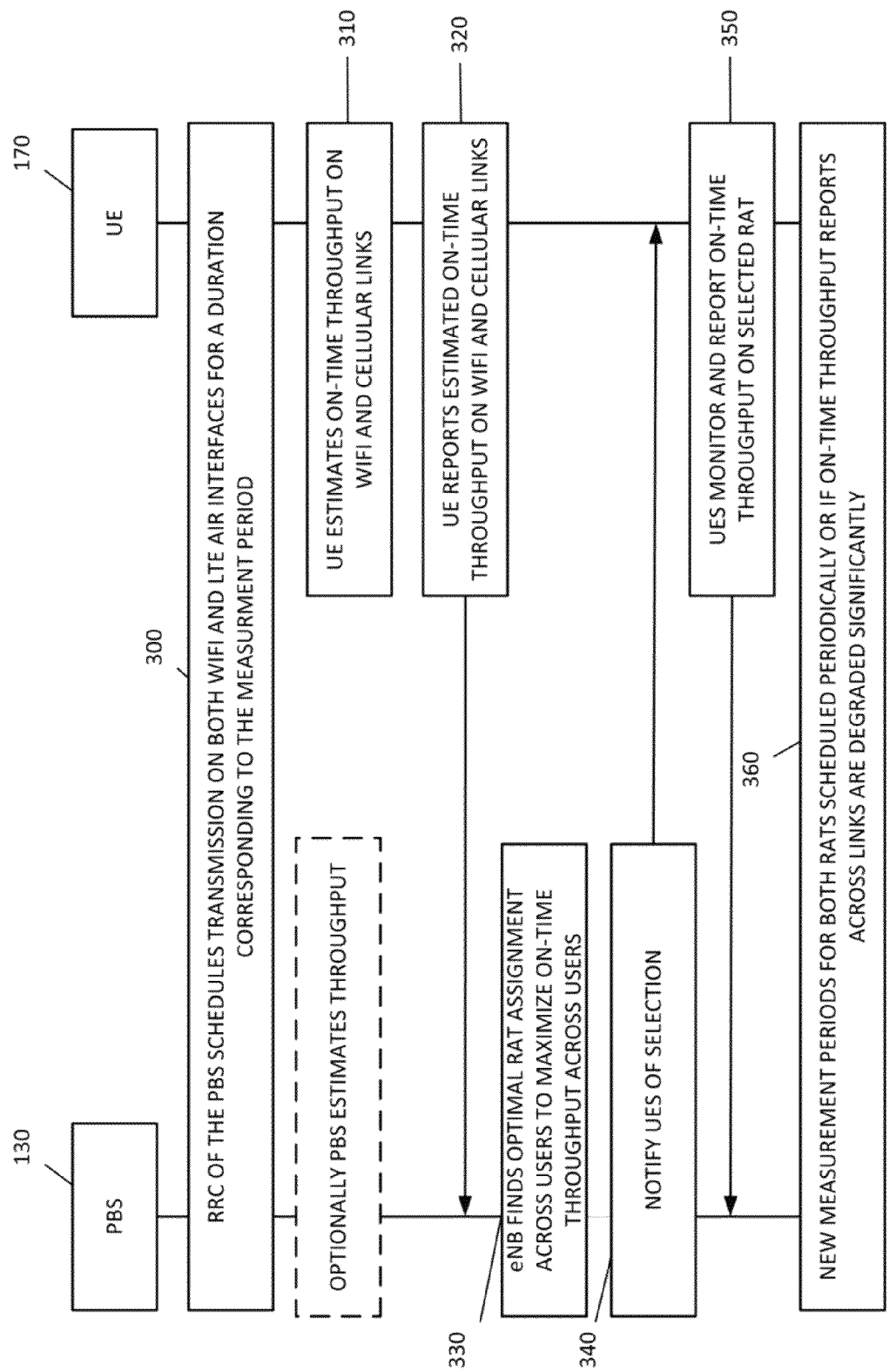
FIG. 3 illustrates an example algorithm for partitioning UEs associated with an integrated base station between multiple RATs supported by the integrated base station.
Figure 5:
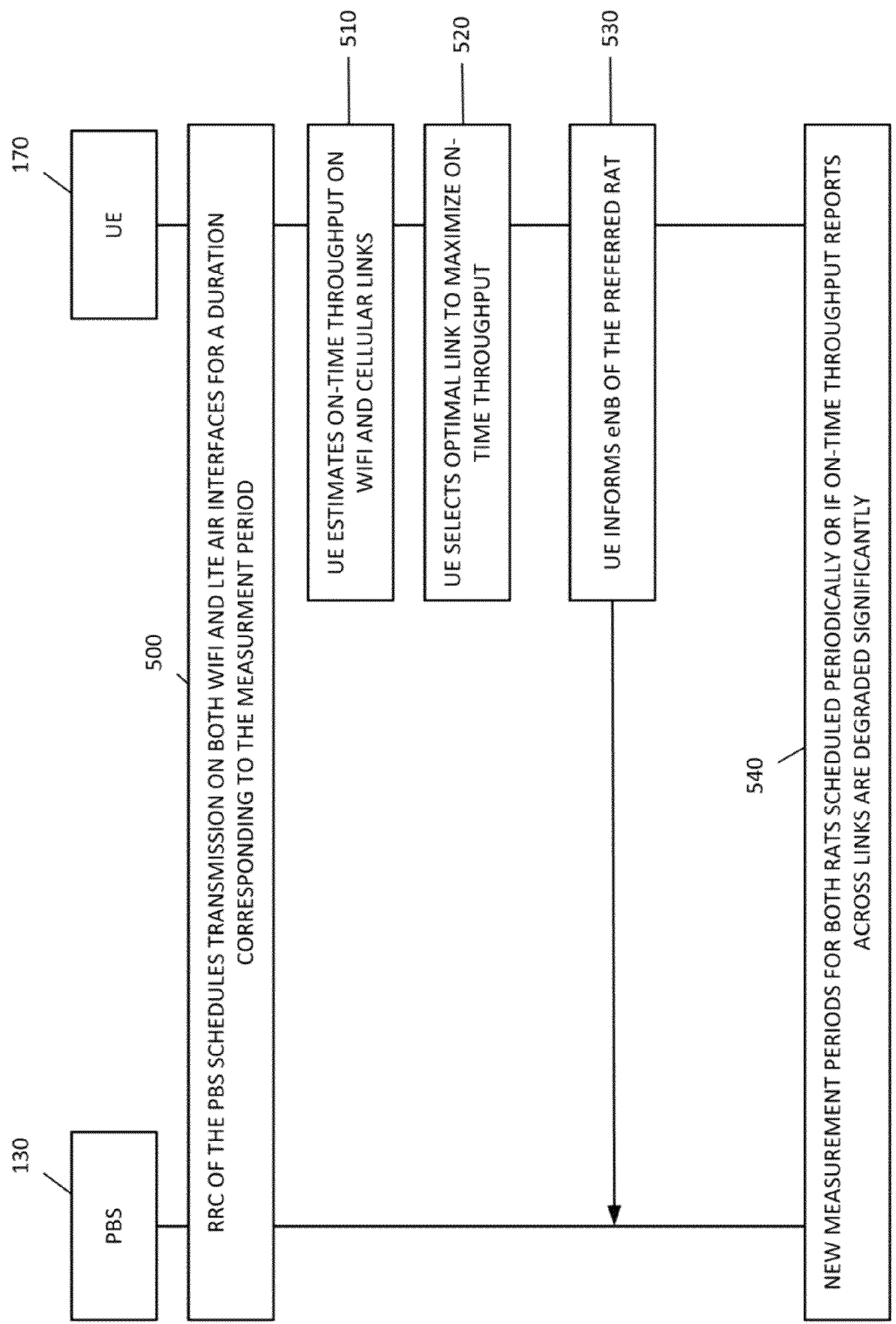
FIG. 5 illustrates an example algorithm for UE-based and eNodeB-based selection of a RAT of multiple RATs supported by an integrated base station.

FIGS. 3 and 5 illustrate operations for RAT partitioning or assigning, and RAT selection in PBS and UE-controlled scenarios, respectively. Example embodiments described herein relate to RAT selection/partitioning for UEs associated with an integrated multi-RAT small cell, for example PBS 130, 150. Example embodiments are described under the assumption that UEs have already been associated with PBSs 130, 150 and offloaded from, for example, macro base station 110.

As will be described in further detail below with respect to example embodiments, the RAT selection decision may be controlled either by the PBS 130, 150 (through operations of a Radio Resource Controller (RRC)) or by the UE 170, 180. Similarly, the scheduling of measurements may be initiated by either the PBS 130, 150 or requested by the UE 170, 180. Further, while example embodiments are described with respect to downlink transmissions, it will be understood that methods described below may further be implemented using uplink transmissions, in which case the on-time throughput measurements are made by the PBS 130, 150 and RAT partitioning or selection may be performed by either the PBS 130, 150 or the UE 170, 180, respectively.

Referring to FIG. 3, in operation 300, the PBS 130 schedules transmissions, for a measurement period, over at least one of the two or more air interfaces integrated within the PBS 130. In the illustrative example, the PBS 130 performs operation 300 through the PBS 130's radio resource controller (RRC) component (not shown). In an illustrative example, for a PBS 130 with an LTE RF transceiver 230 and a Wi-Fi RF transceiver 250, the PBS 130 schedules transmission on both Wi-Fi and LTE air interfaces for a duration corresponding to the measurement period. Test data may be sent during the measurements period or normal data transmission for a "session in progress" may be used for further operations, described below, for estimating "on-time" throughput. In other example embodiments, the PBS 130 may only schedule channel quality indicator (CQI) feedback on the cellular (LTE) air interface.

A UE 170 that is actively using a particular air interface makes periodic measurements to measure per-air interface on-time throughput. However, if a UE 170 is not actively using a particular air interface, the PBS 130 may initiate periodic measurement periods across both air interfaces that allow the UE 170 to estimate on-time throughput. The PBS 130 may transmit a test stream including test data or the PBS 130 may split or replicate the traffic from an existing session across both air interfaces to allow for the estimation.

In at least one embodiment, the PBS 130 may estimate on-time throughput for the LTE air interface by scheduling CQI reports from the UE 170. In this embodiment, the PBS 130 may then estimate on-time throughput based on the projected load on the LTE air interface and the PBS 130's scheduling policy. In this and other embodiments, the PBS 130 may estimate on-time throughput for the Wi-Fi air interface based on received acknowledgements/non-acknowledgements (ACKs/NACKs). In other example embodiments, the PBS 130 may estimate on-time throughput for the uplink, by scheduling appropriate transmissions from the UE 170.

In operation 310, the UE 170 estimates on-time throughput on Wi-Fi and cellular links. As described above with respect to operation 300, if a UE 170 is actively using a particular air interface, the UE 170 may make periodic measurements to measure per-air interface on-time throughput. However, if a UE 170 is not actively using a particular air interface, the PBS 130 may initiate periodic measurement periods across both air interfaces that allow the UE 170 to estimate on-time throughput. The PBS 130 may determine the periodicity for these measurements based on the expected time duration for which the macro-scale environment remains stationary, typically measured in units of seconds or minutes.

As will be appreciated, it may be difficult to estimate on-time throughput on Wi-Fi air interface links due to the contention-based nature of the Media Access Control (MAC) protocol used on Wi-Fi air interface links. However, on-time throughput may be relatively easily estimated for active Wi-Fi air interface links. In some example embodiments, therefore, the measurement period may only be applied to the Wi-Fi air interface if no transmissions are currently scheduled for the Wi-Fi air interface.

In some example embodiments, a UE 170 within the cell 140 may trigger an updated estimated measurement procedure. In example embodiments, the UE 170 may trigger the measurement procedure, described above, based on a determination that on-time throughput has degraded. The determination may be based on a predetermined degradation threshold. In other example embodiments, the PBS 130 may trigger UE 170 estimated on-time throughput measurements based on a determination that the on-time throughput has degraded past a threshold.

Figure 4:
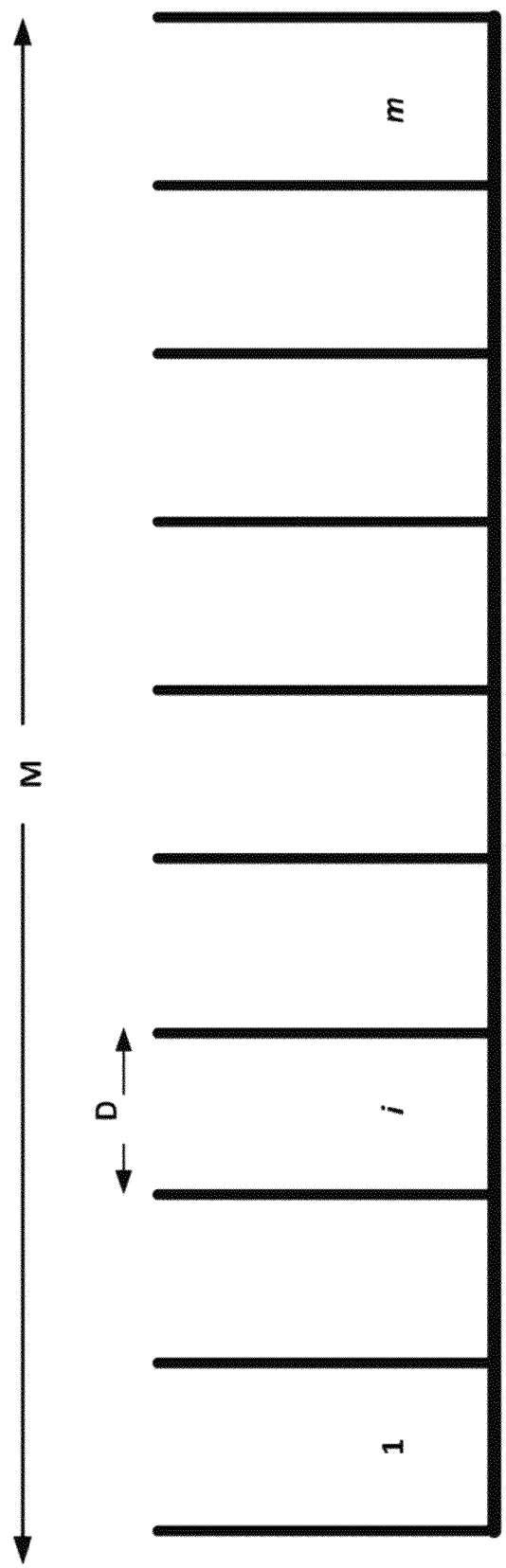
FIG. 4 illustrates an algorithm for estimating on-time throughput according to example embodiments.

Referring to FIG. 4, the UE 170 generates an on-time throughput estimate by dividing the measurement period M into two or more segments, or "bins" i with a duration corresponding to the delay constraint D required for timely throughput for a given delay-sensitive user application. For each bin i, the UE 170 measures the achieved throughput and compares the achieved throughput (A), during that duration, with the target bit-rate, R. Based on the comparison, the UE assigns values to the bins. If the achieved throughput A exceeds the target bit-rate R, then the UE 170 sets the probability of achieving on-time throughput for that bin to 1, else the probability of achieving on-time throughput is set to 0, according to:

$$T_i = I(A_i \geq R), i=1, \ldots m, m = M/D$$

where I is the indicator function.

The UE 170 then calculates an average of the estimates across all bins to determine a probability T of achieving the target bit-rate:

$$T = \frac{1}{m} \sum_{i=1}^{m} T_i$$

In example embodiments, the UE 170 may estimate the on-time probability as the estimated probability T of achieving the target bit-rate, multiplied by the target bit-rate R.

In example embodiments, the measurement period M is determined based on the amount of delay that can be tolerated by applications transmitting on at least one of the two or more air interfaces. For example, as will be noted upon inspection of FIG. 4, the measurement period M depends on the targeted delay D for transmission. As an illustrative example, for real-time video transmitted at the rate of 30 frames per second, the delay constraint D for receiving a frame within a delay threshold is 33 milliseconds. The PBS 130 calculates an overall measurement period M based on the targeted probability T of on-time throughput, which in the case of real-time video should be set relatively high to maintain UE QoS. For relatively high target probabilities, the PBS 130 D, to a correspondingly small value. Typically M would be chosen so that sufficient samples are available for estimation. Further, if several user applications are targeted, in example embodiments, the PBS 130 should set D to a value corresponding to the application with the most aggressive, or strict, on-time throughput requirements.

Referring again to FIG. 3, in operation 320, the UE 170 reports the estimates of the on-time throughput metric to the PBS 130. However in some example embodiments, as described above, the PBS 130 may itself calculate the on-time throughput metric. In some example embodiments, the metric is an aggregation of on-time throughput for UEs within the cell 140.

In operation 330, the PBS 130 assigns UEs within the cell 140 to an air interface of the two or more air interfaces of the cell to maximize the metric of the on-time throughput for UEs within the cell 140. In example embodiments, if the number of UEs 170 in the cell 140 is relatively small, the PBS 130 may exhaustively use estimates provided by each UE 170 within the cell 140 to provide optimal or near-optimal partitioning of UEs across the Wi-Fi and LTE air interfaces. In example embodiments, when the number of UEs 170 in the cell 140 is relatively large, the PBS 130 may partition users to optimize a sum or a product of throughput across UEs 170 within the cell 140.

In operation 340, the PBS 130 notifies the UE 170 of the resulting RAT assignment. In operation 350, after the RAT assignment is complete, the PBS 130 may monitor on-time throughput, and the UEs 170 of the cell 140 may monitor their assigned air interface to monitor on-time throughput. In operation 360, a UE 170 may trigger a measurement update procedure if its link throughput degrades beyond a threshold. The PBS 130 may also schedule regular measurement periods on both RATs and trigger a UE 170 report of estimates of metrics of on-time throughput. The PBS 130 may further update RAT assignments periodically.

FIG. 5 illustrates operations for RAT selection in a UE-controlled scenario. The operations are similar to those described above with respect to FIG. 3.

In operation 300, the PBS 130 schedules transmissions, for a measurement period, over at least one of the two or more air interfaces integrated within the PBS 130. In the illustrative example, the PBS 130 performs operation 300 through the PBS 130's radio resource controller (RRC) component (not shown). In an illustrative example, for a PBS 130 with an LTE RF transceiver 230 and a Wi-Fi RF transceiver 250, the PBS 130 schedules transmission on both Wi-Fi and LTE air interfaces for a duration corresponding to the measurement period.

In operation 510, the UE 170 estimates, over the measurement period, a metric of on-time throughput within the cell 140. In the illustrative example, the UE 170 estimates on-time throughput on Wi-Fi and cellular links. In operation 520, the UE 170 selects an air interface of the two or more air interfaces to maximize the on-time throughput metric within the cell 140. In an example embodiment, the UE 170 compares the on-time throughput estimates on both air interfaces and selects the air interface with the maximum on-time throughput. The UE 170 may apply hysteresis to the selection decision in which the UE 170 may wait for a predetermined number of measurement periods over which an air interface maintains the highest throughput before the UE 170 makes a selection of an air interface. The UE 170 may also control or limit changes to different air interfaces.

In operation 530, the UE 170 notifies the PBS 130 of the preferred RAT.

In operation 540, after the RAT assignment is complete, the PBS 130 may monitor on-time throughput, and the UEs 170 of the cell 140 may monitor their assigned air interface to monitor on-time throughput. A UE 170 may trigger a measurement update procedure if its link throughput degrades beyond a threshold. The PBS 130 may also schedule regular measurement periods on both RATs and trigger a UE 170 report of estimates of metrics of on-time throughput. The PBS 130 may further update RAT assignments periodically.

Figure 6:
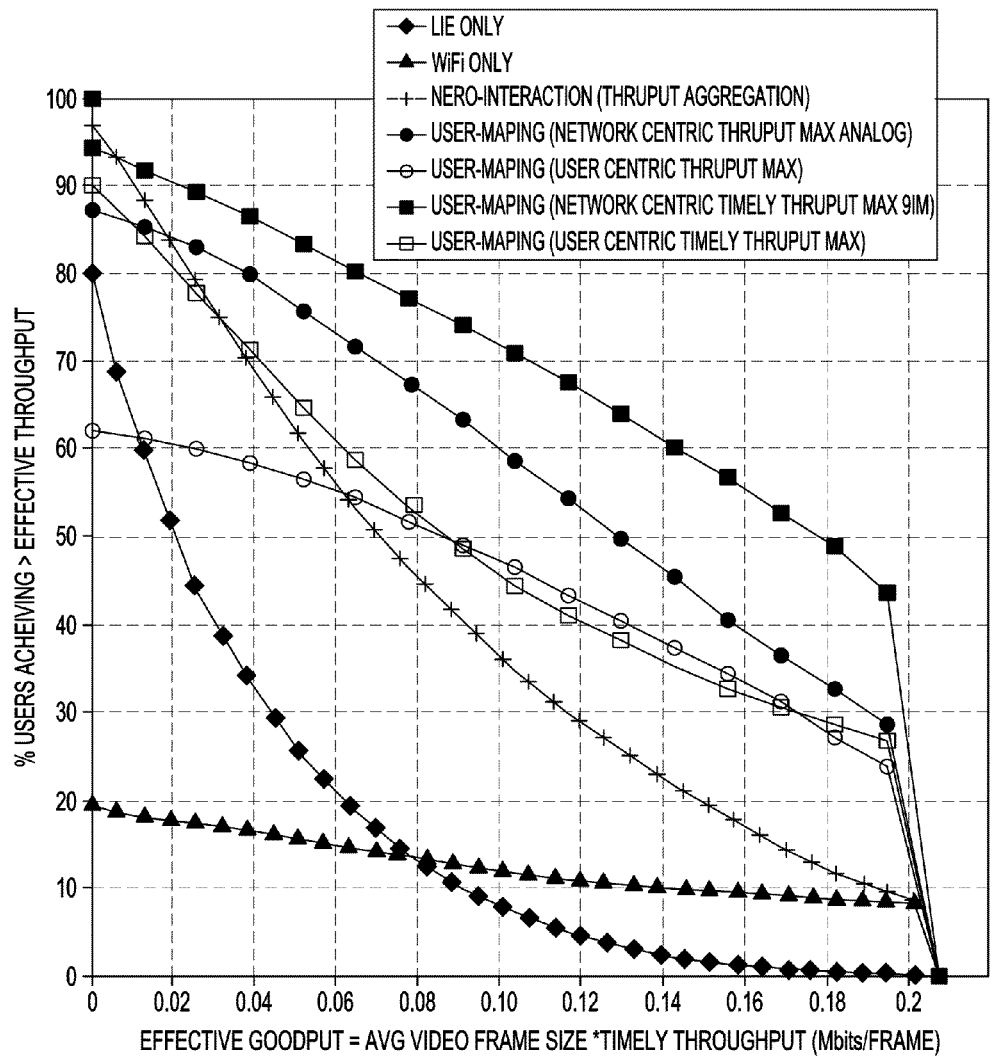
FIG. 6 illustrates the percentage of UEs receiving at least a given effective throughput for various base station RAT configurations and partitioning algorithms.

FIG. 6 illustrates the percentage of UEs achieving different values of on-time throughput when the delay constraint D is 33 milliseconds, correspond to a real-time video application at 30 frames per second. It will be noted that a target on-time rate of 0.2 Mbits/frames (~6 Mbps/second), the network-based scheme based on maximizing on-time throughput outperforms the user-based scheme by 50%. In other words, 50% more additional users may be supported at the target on-time rate.

As described above, methods according to example embodiments may be applicable to both uplink and downlink communications.

The above descriptions have focused on sum on-time throughput across users as a target metric for optimization. Further cross-RAT partitioning methods may be based on maximizing alternate metrics such as product or minimum of on-time throughput across users within a cell. Additionally, the measurement scheduling and estimation procedure, as well as the cross-RAT partitioning algorithm, are equally applicable to other metrics, including any other metrics related to QoS.

Example embodiments have been described with respect to radio links comprising wireless access. It will be understood, however, that the methods described above may be extended to cover measurements on end-to-end links, wherein one or more links is typically in an inactive state.

Further, as discussed above, the specific case of integrated Wi-Fi-LTE (Long Term Evolution) enabled via an integrated Wi-Fi-LTE small cell deployment, was described with regard to the example embodiments. However, similar techniques are applicable for other multi-RAT deployments where two multi-radio links are available for user selection and/or sufficient coordination between the different radio links is available on the network side as well. For example, architectures such as cellular macro base stations and a Wi-Fi access point may also be utilized to implement methods according to example embodiments, wherein some coordination between the infrastructure nodes is allowed to schedule measurements. Alternate combinations of RATs in addition to Wi-Fi and LTE, for example Bluetooth, mm-wave, and 60 GHz, may also be used.

The embodiments as described above may be implemented in various hardware configurations that may include a processor for executing instructions that perform the techniques described. Such instructions may be contained in a suitable storage medium from which they are transferred to a memory or other processor-executable medium.

The embodiments as described herein may be implemented in a number of environments such as part of a wireless local area network (WLAN), 3rd Generation Partnership Project (3GPP) Universal Terrestrial Radio Access Network (UTRAN), or Long-Term-Evolution (LTE) communication system, although the scope of the invention is not limited in this respect. An example LTE system includes a number of mobile stations, defined by the LTE specification as User Equipment (UE), communicating with a base station, defined by the LTE specifications as eNodeB.

Antennas referred to herein may comprise one or more directional or omnidirectional antennas, including, for example, dipole antennas, monopole antennas, patch antennas, loop antennas, microstrip antennas or other types of antennas suitable for transmission of RG signals. In some embodiments, instead of two or more antennas, a single antenna with multiple apertures may be used. In these embodiments, each aperture may be considered a separate antenna. In some multiple-input multiple-output (MIMO) embodiments, antennas may be effectively separated to take advantage of spatial diversity and the different channel characteristics that may result between each of the antennas and the antennas of a transmitting station. In some MIMO embodiments, antennas may be separated by up to $1/10$ of a wavelength or more.

In some embodiments, a receiver as described herein may be configured to receive signals in accordance with specific communication standards, such as the Institute of Electrical and Electronics Engineers (IEEE) standards including IEEE 802.11-2007 and/or 802.11(n) standards and/or proposed specifications for WLANs, although the scope of the invention is not limited in this respect as they may also be suitable to transmit and/or receive communications in accordance with other techniques and standards. In some embodiments, the receiver may be configured to receive signals in accordance with the IEEE 802.16-2004, the IEEE 802.16(e) and/or IEEE 802.16(m) standards for wireless metropolitan area networks (WMANs) including variations and evolutions thereof, although the scope of the invention is not limited in this respect as they may also be suitable to transmit and/or receive communications in accordance with other techniques and standards. In some embodiments, the receiver may be configured to receive signals in accordance with the Universal Terrestrial Radio Access Network (UTRAN) LTE communication standards.

It will be appreciated that, for clarity purposes, the above description describes some embodiments with reference to different functional units or processors. However, it will be apparent that any suitable distribution of functionality between different functional units, processors or domains may be used without detracting from embodiments of the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. One skilled in the art would recognize that various features of the described embodiments may be combined in accordance with the invention. Moreover, it will be appreciated that various modifications and alterations may be made by those skilled in the art without departing from the scope of the invention.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method for partitioning, by an enhanced Node B (eNodeB) serving a cell, user equipment (UEs) within the cell between two or more air interfaces integrated within the cell, the method comprising:
   scheduling test transmissions, for a measurement period, over at least one of the two or more air interfaces;
   estimating, based on the test transmissions, a metric of on-time throughput for the UEs within the cell, the on-time throughput being a measure of an amount of data that arrives at a destination before a delay threshold has been reached and at a bit-rate greater than or equal to a target bit-rate; and
   assigning UEs within the cell to an air interface of the two or more air interfaces of the cell to maximize the metric.

2. The method of claim 1, wherein the metric is an aggregation of the on-time throughput for users within the cell.

3. The method of claim 1, wherein,
   the transmissions comprise user data; and
   the eNodeB divides the transmissions between the two or more air interfaces.

4. The method of claim 1, wherein estimates of the metric are received from users within the cell.

5. The method of claim 1, wherein estimates of the metric are determined by the eNodeB by monitoring the transmissions of UEs within the cell during the measurement period.

6. The method of claim 1, wherein an updated estimated measurement procedure is triggered by a request from a UE within the cell.

7. The method of claim 6, wherein the UE triggers the measurement period based on a determination by the UE that on-time throughput has degraded past a threshold.

8. The method of claim 1, wherein the measurement period is triggered periodically by the eNodeB.

9. The method of claim 1, wherein the measurement period is triggered by the eNodeB based on a determination by the eNodeB that on-time throughput has degraded past a threshold.

10. The method of claim 1, wherein the estimating further comprises:
dividing the measurement period into two or more segments;
comparing a measured throughput for the two or more segments to the target bit-rate; and
assigning values to the two or more segments based on the comparing; and
estimating the metric of on-time throughput based on the values corresponding to the two or more segments.

11. The method of claim 1, wherein the measurement period is determined based on the amount of delay that can be tolerated by applications transmitting on at least one of the two or more air interfaces.

12. The method of claim 1, wherein the two or more air interfaces include a Wi-Fi air interface, an LTE air interface or a WiMax interface.

13. A non-transitory computer-readable medium comprising instructions, that, when executed by a machine, cause the machine to:
request that test transmissions be scheduled, for a measurement period, over at least one of two or more air interfaces;
estimate, over the measurement period, a metric of on-time throughput within a cell, the on-time throughput being a measure of an amount of data that arrives at a destination before a delay threshold has been reached and at a bit-rate greater than or equal to a target bit-rate;
select an air interface of the two or more air interfaces integrated within the cell to maximize the metric within the cell; and
notifying an enhanced Node B (eNodeB) serving the cell of the selection.

14. The non-transitory computer-readable medium of claim 13, comprising instructions that, when executed by the machine, cause the machine to select the air interface of the two or more air interfaces that has the highest on-time throughput.

15. The non-transitory computer-readable medium of claim 13, comprising instructions that, when executed by the machine, cause the machine to:
evaluate the estimated on-time throughput for two or more measurement periods; and
select the air interface that has the highest on-time throughput over each of the two or more measurement periods.

16. An enhanced Node B (eNodeB) comprising:
a first interface for communicating with users within a cell served by the eNodeB and connecting associated users to a core network;
a second air interface for communicating with users within a cell served by the eNodeB and connecting associated users to a core network; and
one or more processors configured to,
schedule test transmissions over at least one of the two or more air interfaces; and
assign UEs within the cell to an air interface of the two or more air interfaces of the cell to maximize on-time throughput within the cell, the on-time throughput being a measure of an amount of data that arrives at a destination before a delay threshold has been reached and at a bit-rate greater than or equal to a target bit-rate.

17. The eNodeB of claim 16, wherein the processor is further arranged to estimate, over a measurement period and based on the transmissions, a metric of on-time throughput for the UEs within the cell, on-time throughput being a measure of the amount of data that arrives at a destination before a delay threshold has been reached and at a bit-rate greater than or equal to a target bit-rate.

18. The eNodeB of claim 16, wherein one of the first air interface and the second air interface are arranged to receive estimates of the on-time throughput metric from UEs within the cell.

19. The eNodeB of claim 16, wherein the processor is further arranged to:
divide data for transmission between the two or more air interfaces, the data being test data or user data.

20. The eNodeB of claim 16, wherein an updated estimated measurement procedure is triggered by a request from a UE within the cell based on a determination by the UE that on-time throughput has degraded past a threshold.

21. The eNodeB of claim 16, wherein the processor is further arranged to:
divide the measurement period into two or more segments;
compare a measured throughput for the two or more segments to the target bit-rate;
assign values to the two or more segments based on the comparing; and
estimate the metric of on-time throughput based on the values corresponding to the two or more segments.

22. The eNodeB of claim 16, wherein the processor is further arranged to set the measurement period based on an amount of delay that can be tolerated by applications transmitting on at least one of the first air interface and the second air interface.

23. A user equipment (UE) operating within a cell of a wireless communication network, the UE comprising:
a first communication module arranged to communicate over a first air interface;
a second communications module arranged to communicate over a second air interface; and
a processor configured to,
select the air interface of the two or more interfaces to maximize on-time throughput within the cell, the on-time throughput being a measure of an amount of data that arrives at a destination before a delay threshold has been reached and at a bit-rate greater than or equal to a target bit-rate;
notify an enhanced Node B (eNodeB) serving the cell of the selection; and
request that test transmissions be scheduled over at least one of the two or more air interfaces based on a determination that on-time throughput has degraded.

24. The UE of claim 23, wherein the processor is further arranged to:
estimate a metric of the on-time throughput within the cell; and
transmit the metric to the eNodeB.

25. The UE of claim 23, wherein the processor is further arranged to select the air interface of the two or more air interfaces that has the highest on-time throughput over at least two measurement periods.

* * * * *